April 13, 1948.   R. H. HODGSON   2,439,515
VALVE FOR STEP-BY-STEP SERVOMOTORS
Filed Feb. 6, 1946   2 Sheets-Sheet 1

INVENTOR
RICHARD HAROLD HODGSON
ATTORNEY

April 13, 1948.  R. H. HODGSON  2,439,515
VALVE FOR STEP-BY-STEP SERVOMOTORS
Filed Feb. 6, 1946  2 Sheets-Sheet 2

INVENTOR
RICHARD HAROLD HODGSON

ATTORNEY

Patented Apr. 13, 1948

2,439,515

UNITED STATES PATENT OFFICE 2,439,515

VALVE FOR STEP-BY-STEP SERVOMOTORS

Richard Harold Hodgson, Vancouver, British Columbia, Canada

Application February 6, 1946, Serial No. 645,818

8 Claims. (Cl. 121—46.5)

My invention relates to improvements in valves for step-by-step servomotors, which are particularly adapted for use in actuating such devices as marine reversing gears and the like, of for operating a member in between predetermined positions. This application is a continuation-in-part of application Serial No. 632,144, filed December 1, 1945, now abandoned.

The object of the invention is to provide a simple valve mechanism which will in response to negative pressure, move a piston from one end position to an intermediate position or to the opposite end position by corresponding movement of a control valve lever, and cause opposite piston movement in response to corresponding opposite movement of the valve lever, the piston coming to rest, closing the intermediate cylinder port and stopping at either of the end ports when reaching the end positions. A further object is to provide means whereby creeping of the piston from a set position is rendered impossible. A further object is to provide a valve to perform the above functions by means of a single wire or push pull rod and perform all of said functions without having to resort to check valves and separate venting valves.

Referring to the drawings.

In the drawings like characters of reference indicate corresponding parts in each figure.

Figure 1:
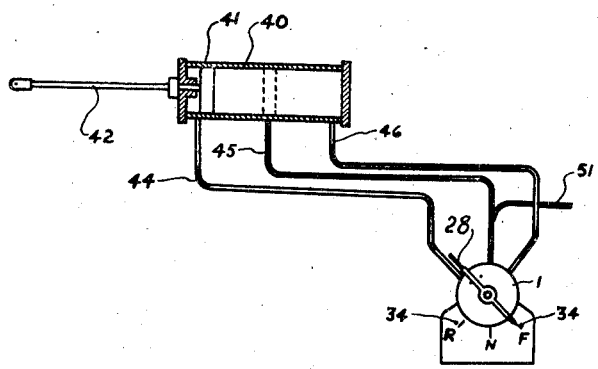
Fig. 1 is a schematic view of the control valve connected to an operating cylinder.

The numeral 1 indicates the control valve which consists of a cylindrical casing 2 having an elongated circumferential chase 3 and an air inlet 4 communicating therewith. Opposite the chase 3 are flow and return ports 5, 6 and 7, all of which are on the same plane as the chase 3. A suction port 9, see Figure 8 hereinafter referred to as a final suction port, is provided in the casing in a plane below the port 7 and is adapted for connection to a source of suction to finally remove air entering the valve through any of the flow and return ports.

Rockingly mounted in the casing 2 is a cylindrical valve plug 11 having a V-shaped passage 12 having side extensions to its legs to form flow ports 14, 15, 16 and 17. The upper terminal ends of all these ports are adapted to be moved into selective register with the casing ports 5, 6 and 7 and the common terminal end designated by the numeral 20 remains in register with the chase 3 and the port 4 only. The spacing of the casing port 5 from the port 7 is greater than the spacing of the port 6 from the port 7, the spacing between ports 5 and 7 being 53 degrees and the spacing between the ports 6 and 7 being 37 degrees. An outlet port 22 is recessed into the plug 11 which consists of a circumferential channel or second suction 23 which is twice the width of any of the ports 14, 15, 16 and 17 and will be referred to as having sides 23A and 23B, a longitudinal channel 24 and a suction channel 25. The channel 23 is capable of being brought into register with the ports 5, 6 and 7, and the channel 25 is adapted to remain in register with the port 9 throughout the entire operative movement of the valve plug 11. The spacing of the ports 14, 15, 23, sides A and B, 16 and 17 are as follows: Ports 14 and 15, 37 degrees apart centre to centre; 15 to 23B, 53 degrees; from 23A to 16, 37 degrees, and from 16 to 17, 53 degrees, and the centre of the side 23B is 15 degrees from the centre of the side 23A.

Figure 8:
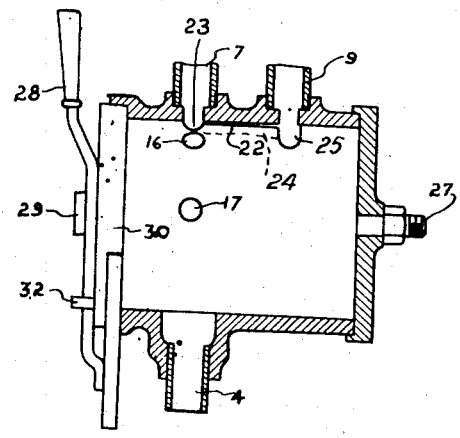
Fig. 8 is a longitudinal sectional view taken on the line 8—8 of Figure 2.

The valve plug 11 is held in position within the casing by a screw 27, see Figure 8, and is rocked about its axis by a lever 28 which is rockingly mounted upon a pin 29 extending into the plug head 30. The rocking movement of the handle is limited by stops 32 equally spaced from the vertical axis X, which permits a total rocking movement of the lever about the head 30 of approximately 15 degrees. Stops 34, see Figure 1, are provided on the outer periphery of the casing to limit the rocking movement of the plug 11.

In Figure 1 a cylinder 40 having a piston 41 and piston rod 42 is connected to the valve 1 by pipes 44, 45 and 46. The pipe 44 connects the port 5 with the front end of the cylinder 40; the pipe 45 connects the port 7 with the centre of the cylinder and the pipe 46 connects the port 6 with the rear end of the cylinder. The suction port 9 of the valve casing is connected by a pipe 51 to the engine intake manifold or a suitable source of negative pressure.

The piston 41 is presumed in this specification to be operatively connected to a reverse gear, not shown, wherein the piston being moved to the left as in Figure 1, or to the front end of the cylinder, will give a forward drive, or being moved to the rear of the cylinder will give a reverse drive and on being moved to central position within the cylinder 40 will give neutral, or no drive.

Figures 2, 3:
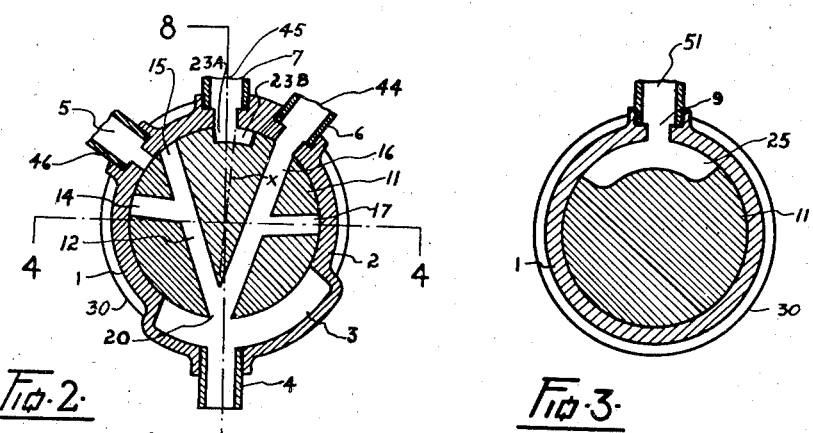
Fig. 2 is a transverse sectional view of the valve taken through the delivery ports, taken on the line 2—2 of Figure 4.
Fig. 3 is a transverse sectional view taken on the line 3—3 of Figure 4.
Figure 4:
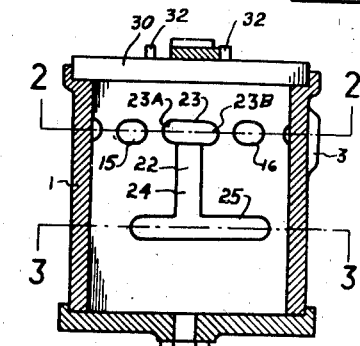
Fig. 4 is a sectional view of the valve casing, taken on the line 4—4 of Figure 2, and showing the valve plug in elevation.

As shown in Figure 2, the valve is set in neutral position, with the side 23A of the passage 23 only in register with the port 7 and the valve plug ports 14, 15, and 17 out of register with the valve casing ports 5 and 7, and port 16 in register with port 6. If the lever is moved from centre position to hard over to the left, the plug 11 will be in the position shown in Figure 5, so that air may flow through the chase 3 through the port 17 and the pipe 46 to the back of the piston. At this time the port 7 is closed, so that the air can only be drawn from the cylinder 40 through the pipe 44, the side A of the port 23, the recessed port 22 and the pipe 51. It should be noted that in moving the lever the plug lags behind it, so that if it has been moved to its stop 34 to the left, the axis of the plug will be 7½ degrees to the right of the lever and if the next lever movement is to the right the lever will move 7½ degrees before the plug starts to move and when the lever is brought to rest, the axis X of the plug will be 7½ degrees to the left of the lever and whatever casing port the plug port 23 connects with it will be the forward side or the side 23B which will be in proper register with said port. If the next movement of the lever is also to the right, there will be no slack to take up, so that the plug axis will still be lagging 7½ degrees to the left. In view of this slack, it will be seen that any movement of the lever from contact with either of the stops 34 will result in a free lever movement of 7½ degrees and a lag of 7½ degrees on the plug, making a total lag of 15 degrees, whereas if the lever movement starts away from the stops and in the same direction as the previous movement, the plug will continue to lag 7½ degrees behind it. The lever is adapted to swing approximately 90 degrees and impart a maximum movement in either direction of 75 degrees to the plug, the lever movement from forward to neutral is 53 degrees and from neutral to reverse is 37 degrees and from reverse to neutral 37 degrees and from neutral to forward 53 degrees. Spaced graduations R, N and F may be provided on or about the face of the valve as shown in Figure 1 to indicate the reverse, neutral and forward points at which the lever should be brought to rest irrespective of its movement being from right to left, or left to right.

Figure 5:
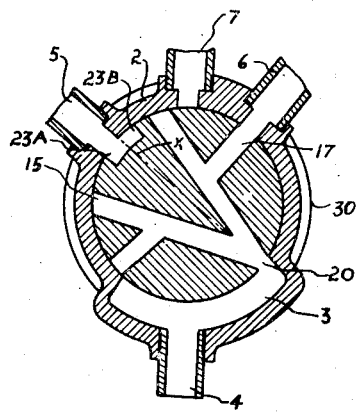
Figs. 5, 6 and 7 are transverse sectional views taken on the line 2—2 of Figure 4 showing various valve settings.
Figure 6:
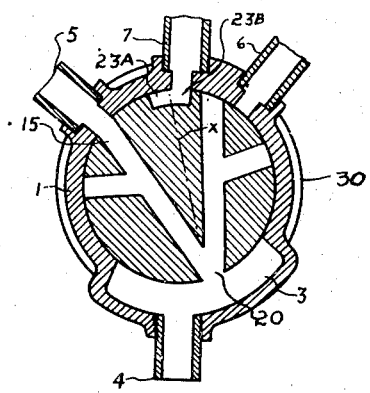
Figure 9:
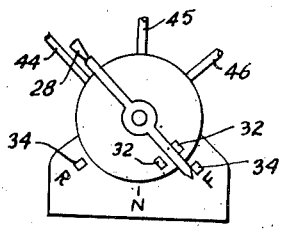
Fig. 9 is a reduced scale view of the head of the valve.
Figure 7:
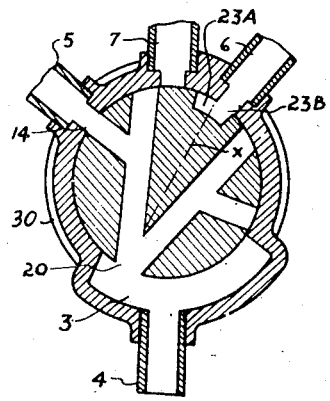

Assuming the lever to be hard over to the left as in Figure 5, and it is desired to throw the gear into neutral the lever is moved to N or intermediate position, causing the plug to turn to the position shown in Figure 6, the lever moving 15 degrees slack and then turning the plug 37 degrees, where air drawn in through the pipe 4 and chase 3 will flow through ports 15 and 5 to the forward side of the piston 41 and the cylinder 40 will be exhausted through the port 7 and the leading side B of the port 23 and recessed port 22, the port 9 and the pipe 51 to the source of suction, the piston travelling to cover the central cylinder outlet to pipe 45. If the lever is next moved to the right to move the piston 41 to the right and engage the reversing gear, the plug will swing 37 degrees this time without any further lag, to the position shown in Figure 7, thus allowing the right end of the cylinder to completely exhaust through the pipe 46, the port 6, the side B of the port 23, the ports 22 and 9 and the pipe 51 to the source of suction. In this lever movement to the right, the piston has stopped to the left of the port through which the cylinder was exhausted.

If instead of the two movements last described, the lever is swung in one movement from hard over left to hard over right, 23B will come into register with the port 6 and port 14 into register with 5, thus exhausting the entire cylinder 40 and moving the piston right over to the end of its stroke. The next lever movement must obviously be in the opposite direction or to the left from hard over right, consequently a lag of 15 degrees will again ensue between the lever and the valve plug 11.

The lateral enlargement of the plug port 23 to define sides 23A and 23B and the slack motion above described, makes it possible for the pointer 35 when stopped on "N" on the dial to cause the piston 41 to come to rest covering the intermediate cylinder port irrespective of the direction in which the lever was last moved. Obviously if the valve is controlled from a lever at a remote point, the lever will be stopped at a single predetermined point corresponding to N on the valve to give the neutral position.

It will be noticed there is no need for separate venting or the use of any check valves such as are normally required.

What I claim as my invention is:

1. A remote control valve for controlling the movement of a piston in a cylinder from one cylinder end point to an intermediate point and an opposite end point, said valve comprising a valve casing having an inlet port and three flow and return ports, said flow and return ports being adapted for connection to the cylinder ports, said casing also having a final suction port adapted for connection to a source of suction, said flow and return ports being aligned with each other, a valve plug rockingly mounted within the casing, said plug having an entrance passage adapted for constant register with the inlet port, said entrance passage communicating with four flow ports each of which are adapted to register with some of the flow and return ports of the casing, said plug having a second suction port or channel and a communicating channel, said second suction port being adapted to register with the flow and return ports and said communicating channel being adapted for constant registration of the final suction port of the casing, and means for rocking the plug to effect the desired port registration.

2. A remote control valve for controlling the movement of a piston in a cylinder from one cylinder end point to an intermediate point and an opposite end point, said valve comprising a valve casing having an inlet port and three flow and return ports, said flow and return ports being adapted for connection to the cylinder ports, said casing also having a final suction port adapted for connection to a source of suction, said flow and return ports being aligned with each other, a valve plug rockingly mounted within the casing, said plug having an entrance passage adapted for constant register with the inlet port, said entrance passage communicating with four flow ports each of which were adapted to register with some of the flow and return ports of the casing, said plug having a second suction port or channel and a communicating channel, said second suction port being adapted to register with the flow and return ports and said communicating channel being adapted for constant registration with the final suction port of the casing, and a lever connected to rock the plug, said lever being connected by lost motion means between the lever and plug to allow some of the lever movements to lead the plug and some to cause simultaneous and equal movements of said plug.

3. A remote control valve comprising a valve casing having an inlet, two side and a centre flow and return port disposed circumferentially of the casing, the side ports being set fifty-three and thirty-seven degrees respectively from the centre port, and a final suction port, a valve plug rockingly journalled within the casing, said plug being provided with a ported passage having one opening adapted to register with the inlet of the casing and four flow ports lying in a single plane, some of said ports being adapted for selective registration with the three flow and return ports, said plug having a communicating recessed channel and suction port or channel in constant register with the final suction port and adapted to selectively register with the three flow and return passages, said suction port or channel of the recessed channel being in the same plane as the three flow ports lying between the inner pair of said four flow ports, and a lever for rocking the plug.

4. A remote control valve as claimed in claim 3, said lever being adapted to swing between stops and having some rotational lost motion relative to said plug.

5. A remote control valve comprising a cylindrical casing having an inlet port and a final suction port, and three circumferentially arranged ports forming side and centre ports and adapted to serve selectively as flow and return ports, a plug within the casing, said plug having a port with one end in constant register with the inlet port and four flow openings communicating with the opposite end of said port, some of which are adapted for selective registration with some of the three circumferentially arranged ports of the casing, a second suction port or channel aligned with the four flow ports and in communication with the final suction port, said second suction port or channel having a width at the periphery of the plug substantially twice that of each of the four openings, and means for rocking the plug.

6. A remote control valve comprising a cylindrical casing having an inlet port and a final suction port, and three circumferentially arranged ports forming side and centre ports and adapted to serve selectively as flow and return ports, a plug within the casing, said plug having an entrance opening in constant register with the inlet port, said entrance having four flow ports, some of which are adapted for selective registration with the three circumferentially arranged ports of the casing, a second suction port or channel circumferentially aligned with the four openings, a passage communicating with said second suction port and in constant communication with the final suction port, said second suction port or channel having a width at the periphery of the plug substantially twice that of each of the four openings, and means for rocking the plug, said rocking means being freely mounted upon the plug to permit lost motion between said means and the plug.

7. A remote control valve comprising a cylindrical casing having an inlet port and a final suction port, and three circumferentially arranged ports forming side and centre ports and adapted to serve selectively as flow and return ports, a plug within the casing, said plug having an entrance opening with one end in constant register with the inlet port and four flow ports communicating with the opposite end of said opening, some of said flow ports being adapted for selective registration with some of the three circumferentially arranged ports of the casing, a second suction port or channel circumferentially aligned with the four openings, a passage communicating with said second suction port and in constant communication with the final suction port, said second suction port having a width at the periphery of the plug substantially twice that of each of the four openings, and means for rocking the plug, one side of the second suction port or channel of the plug being adapted to register with the circumferentially arranged ports of the casing as the plug is rocked in one direction and the opposite side of said wide port being adapted to register with said casing ports as the plug is rocked in the opposite direction.

8. A valve for controlling the movement of a piston from a first end to a middle position and to a second end position within a cylinder and reverse, said valve comprising a cylindrical casing having an inlet port and a final suction port and three circumferentially arranged ports forming side and centre ports and adapted to serve as flow and return ports, a plug within the casing, said plug having five passages, some of which are registrable selectively with the three circumferentially arranged ports, said plug having an operating handle connected thereto with a lost motion of substantially fifteen degrees, said lever being adapted to be swung a total of ninety degrees to cause through the fluid flow through said valve a piston movement from the first cylinder end to the second end position or vice versa and to move fifty-three degrees to cause a piston movement from the first end position to the middle position and to move thirty-seven degrees to cause the piston to move from the middle position to the second end position and vice versa.

RICHARD HAROLD HODGSON.

REFERENCES CITED

The following references are of record in the file of this patent:

UNITED STATES PATENTS

| Number | Name | Date |
| --- | --- | --- |
| 1,046,529 | Winton | Dec. 10, 1912 |

FOREIGN PATENTS

| Number | Country | Date |
| --- | --- | --- |
| 412,960 | Great Britain | July 2, 1934 |
| 848,883 | France | Aug. 7, 1939 |